July 12, 1966
W. RÖSLER
3,260,833
METHOD OF AND APPARATUS FOR THE PRODUCTION
OF WELDED JOINTS IN MESHWORK UNITS
Filed Jan. 22, 1963
7 Sheets-Sheet 1
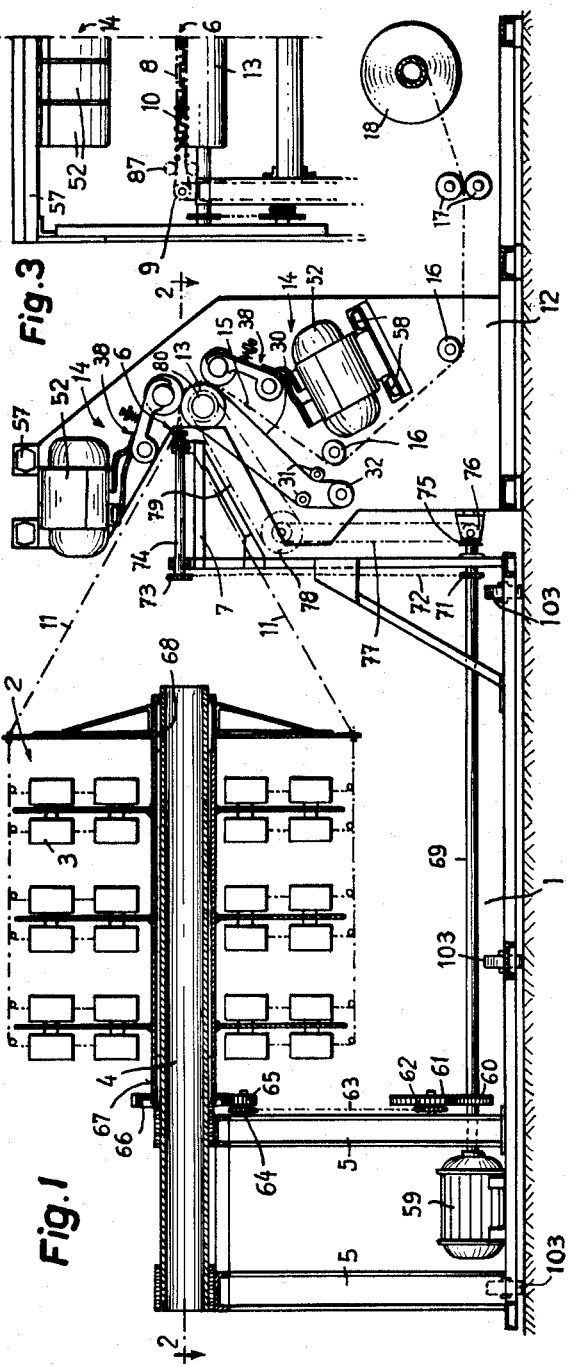
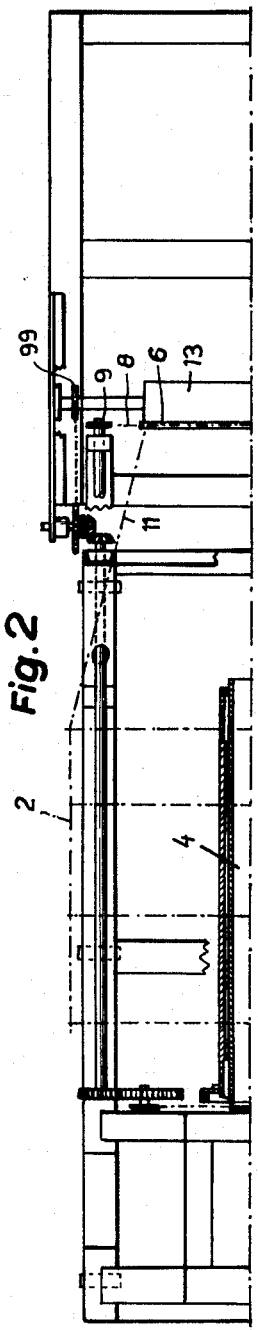
INVENTOR
Walter Rösler
BY
Lowry & Rinehart
ATTYS.

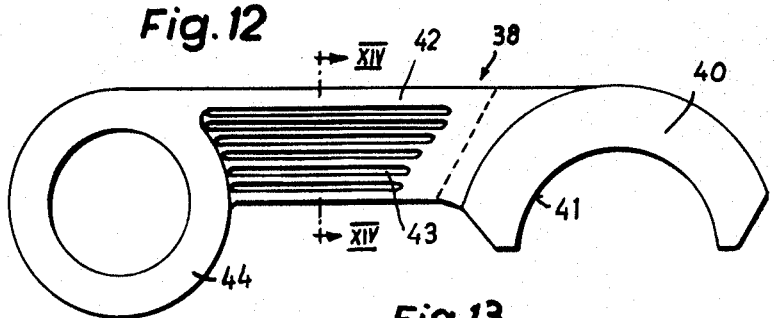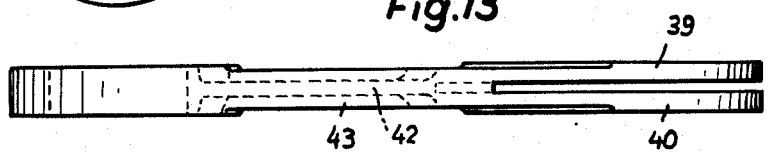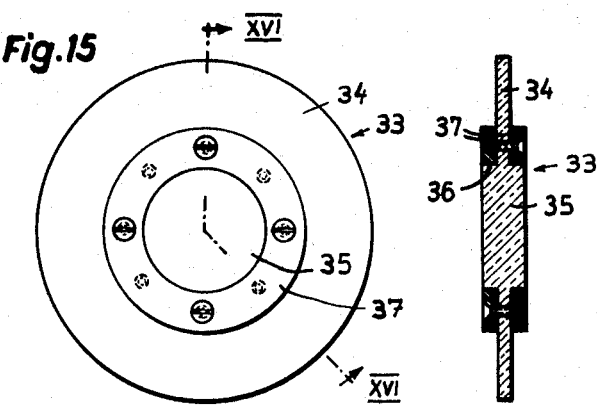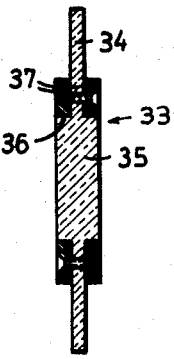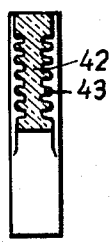

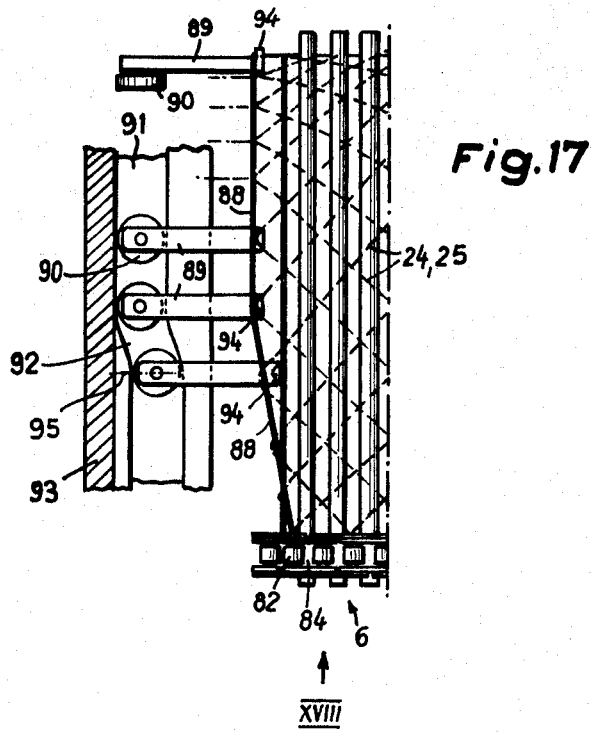
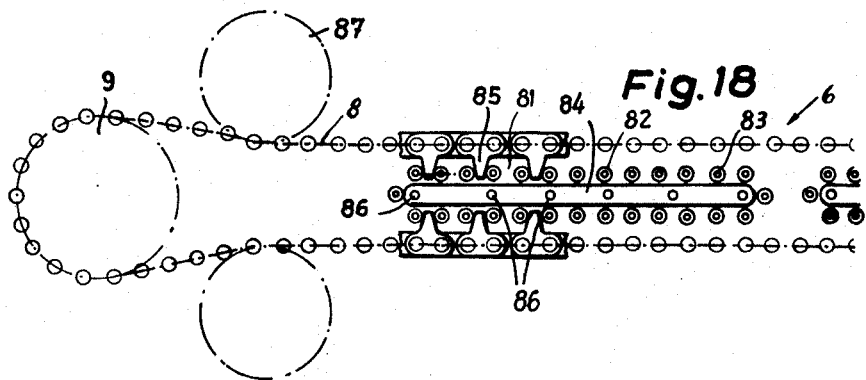

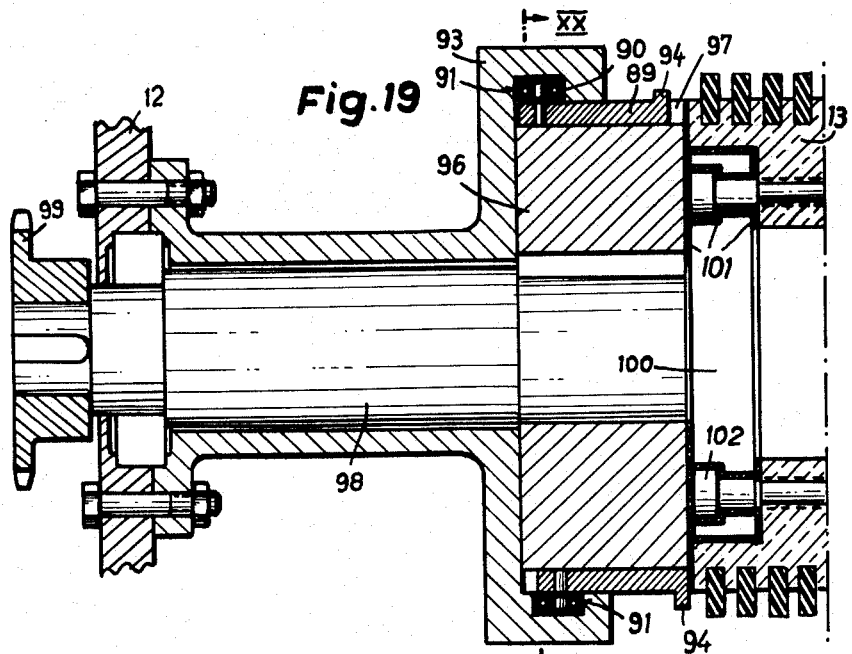
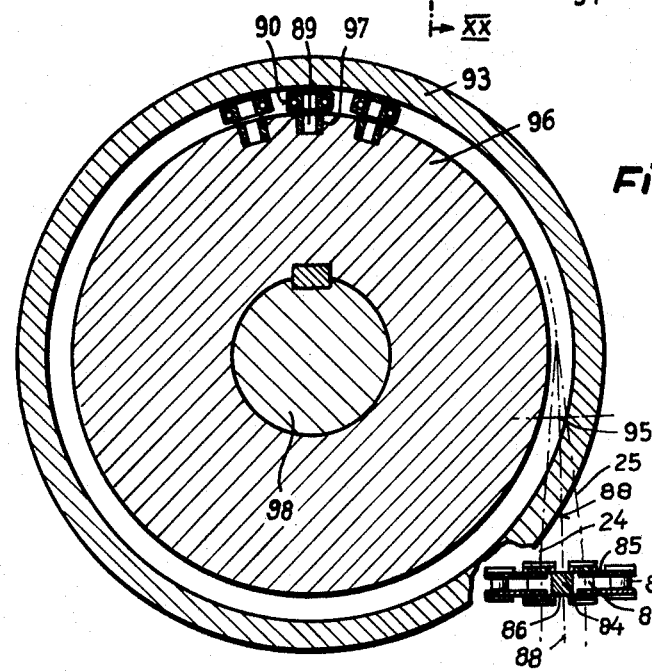

United States Patent Office 3,260,833
Patented July 12, 1966

3,260,833
METHOD OF AND APPARATUS FOR THE PRODUCTION OF WELDED JOINTS IN MESHWORK UNITS
Walter Rösler, Soest, Westphalia, Germany, assignor to Drahtwerke Rösler K.G., Soest, Westphalia, Germany
Filed Jan. 22, 1963, Ser. No. 253,209
Claims priority, application Germany, Jan. 24, 1962, D 37,982
14 Claims. (Cl. 219—56)

This invention relates to a method of and an apparatus for the production of welded joints at the points of intersections of filaments, wires or the like in meshwork units having filaments and the like intersecting diagonally with respect to the logitudinal direction, in a continuous working operation.

Apparatus of many different kinds are already known for the manufacture of meshwork units having weldable filaments, wires and the like which intersect diagonally to the longitudinal direction. There are difficulties in welding the points of intersection of the meshwork units thus produced with intersecting filaments and the like without having to interrupt the continuous operation for the production of the meshwork units. Unless the welding device is not actually arranged and operated completely independently of the device for manufacturing the meshwork units, the execution of the welded joints at the points of intersection is effected intermittently in a non-continuous working operation. This slows down the manufacturing process for the welded meshwork unit as a whole, and therefore means a lower output.

According to the invention, these disadvantages are eliminated. The invention is characterized in that the filaments, wires and the like are drawn off a rotating bobbin carrier and are fed through the agency of a guide device to a support for forming a meshwork unit, and the meshwork unit obtained is at the same time subjected to a continuous welding operation at the point of intersection during its continuous conveyance on the said support. In this way, an uninterrupted working operation is obtained from the drawing-off of the filaments, wires and the like from the individual bobbins as far as the finished meshwork unit connected together by welding at the points of intersection. Such an uninterrupted manufacturing process has the advantage that the meshwork unit is welded at the points of intersection substantially at the same time as it is formed. At the instant of the mechanical formation of the meshwork unit, the latter has the intersecting filaments, wires and the like in the theoretically correct position. The welding step is carried out while the wires are in this correct position relative to one another, so that a satisfactory meshwork unit formation is obtained. At the same time, the direct coupling of the working operations for the formation of the meshwork unit and the securing of the wires at the points of intersection saves a substantial amount of work. Intermediate winding of the meshwork unit and unwinding it again for a following welding operation are not required now. The outlay on the apparatus as a whole is reduced. A higher working output is obtained.

The apparatus for this measure according to the invention, wherein the meshwork unit formed is advantageously guided over a cylinder, is characterized in that the cylinder has a channel-like diagonal profiling corresponding to the course of the meshes of the meshwork unit, and is also provided with grooves which extend over the cylinder periphery in the longitudinal direction of the meshwork unit in accordance with the lines connecting the points of intersection. The parts provided with diagonal profiling are made of an insulating material, while the base surface of the grooves is formed of a conductive material, preferably copper. Current supplying electrode rollers also engage in the grooves. Current of different polarity is present between two neighboring electrode rollers or roller sets, the cylinder consisting of conductive material serving as a counter electrode or bridge electrode. As a result, continuous execution of the welded joints at the points of intersection at the instant when the meshwork unit is actually manufactured, is guaranteed. The construction of the cylinder according to the invention makes it possible for the current to enter in the vertical direction through the copper cylinder during the continuous movement of the cylinder and at the same time of the meshwork unit running over it, so that the maximum electrical resistance is used only for the welding operation. The current cannot flow out laterally.

According to a further feature of the invention, there are arranged between the insulating profile parts endless strips of copper or the like which bear freely against the base surface of the grooves in the copper cylinder and move at the same speed as the peripheral speed of the cylinder. These copper strips are advantageously of a substantially greater length than the cylinder periphery. As a result, on the one hand, rapid and effective dissipation of the welding heat is obtained, and on the other hand the base surfaces of the grooves on which the electrode rollers roll are protected from damage to a considerable extent. If the base surfaces become worn by the continual welding operations, it is merely necessary to replace the loose copper strips. The copper cylinder in itself remains substantially unused.

The parts provided with the diagonal profiling are conveniently rings of elastomeric material, e.g. rubber, synthetic plastic material and the like, which are inserted in annular depressions in the cylinder. The profiling advantageously consists of V-shaped channels extending in the diagonal direction, the wires and the like of the meshwork unit coming to lie in these channels in accordance with the meshes which are formed. The electrode rollers themselves can be mounted to be rotatable and interchangeable in current conducting electrode holders, and care should be taken to insure an adequate current connection. This can be obtained by making the electrode roller rotate by means of a projecting disc arranged on the said roller between fork-like jaws of the electrode holder which bear close against the disc.

The general arrangement of the welding apparatus according to the invention is advantageously such that the cylinder with the electrode rollers and electrode holders and also with transformers is arranged by itself on a common machine frame. The bobbin stand with guide device is conveniently situated on an independent frame which is advantageously made mobile. This guarantees rapid interchanging of the bobbin frame when the bobbins become exhausted, with a new previously prepared bobbin frame. The displacement of the bobbin frame for interchanging purposes is advantageously effected in a direction transverse to the direction of conveyance of the meshwork unit to be formed.

With the above and other objects in view that will become apparent as the nature of the invention is better understood, the same consists in the novel form, combination and arrangement of parts hereinafter more fully described, shown in the accompanying drawings, and claimed.

In the drawings:

FIG. 1 is a diagrammatic side elevational view of apparatus according to the invention with parts broken away and shown in section;

FIG. 2 is a diagrammatic half section horizontal sectional view taken generally along the line 2—2 of FIG. 1;

FIG. 3 is a fragmentary half section end view of a filament guide device;

Figure 4:
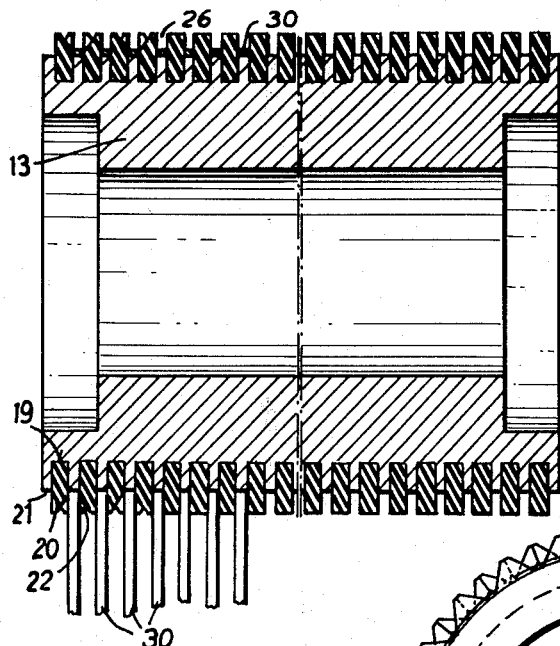
FIG. 4 is a longitudinal sectional view through a copper cylinder, on which a meshwork unit is simultaneously formed and welded at the points of intersection.
Figure 5:
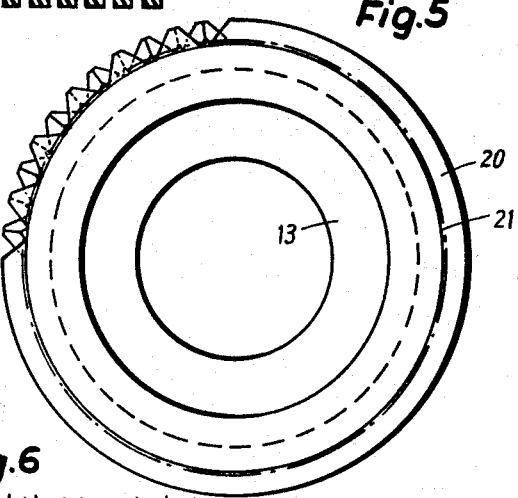
FIG. 5 is an end view of the cylinder of FIG. 4.
Figure 7:
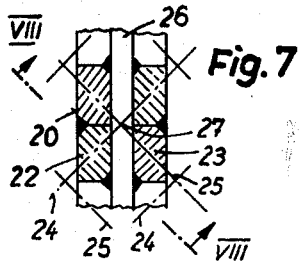
FIG. 7 is a developed plan view on a larger scale showing in more detail the cylinder surface.
Figure 6:
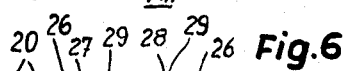
FIG. 6 is a developed plan view of a fragmentary portion of the cylinder surface.
Figure 8:
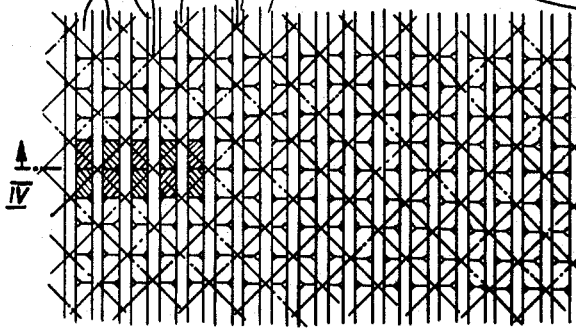
FIG. 8 is a sectional view taken on the line VIII—VIII of FIG. 7.

FIGS. 12, 13, and 14 are respectively a side view, plan view and sectional view on the line XIV—XIV of FIG. 12, of the electrode holder with all of the views being enlarged views;

FIG. 15 is an enlarged side view of the electrode roller;

FIG. 16 is an enlarged vertical sectional view of the electrode roller of FIG. 15 taken on the line XVI—XVI;

FIGS. 17 to 20 show apparatus for feeding-in longitudinal and edge wires which can be welded simultaneously to the crosswise-arranged meshwork wires, FIG. 17 being a fragmentary plan view of a profiled cylinder with a tensioned device for the edge wires;

FIG. 18 is a diagrammatic view taken in the direction of the arrow XVIII in FIG. 17;

FIG. 19 is a fragmentary sectional view through the end of the copper cylinder and shows the mounting thereof; and FIG. 20 is a cross-sectional view taken on the line XX—XX of FIG. 19.

The apparatus according to the invention for the continuous production of welded meshwork units with weldable filaments, wires and the like intersecting diagonally to the longitudinal direction of advancement is composed of two frame parts which are constructed so that they can be releasably connected to one another. One of the frames, which is referred to by the reference numeral 1, is the carrier for a bobbin cage 2 on which any desired number of filament or wire bobbins 3 are arranged. The bobbin cage 2 is mounted for rotation about a shaft 4 which is mounted at one end in uprights 5.

Situated at a distance from the bobbin cage 2 is a filament guide device 6 which is carried by cantilever arms 7 of the frame 1. The guide device 6 is so constructed that it consists of at least one chain 8 which is in the form of an endless chain entrained about chain wheels 9 (FIG. 3). Situated in links of the chain 8 are bores or tubes 10 through which the filaments 11 drawn off the bobbins 3 are taken. The relationship between the movement of the bobbin cage 2 and that of the chain 8 is kept constant; i.e. when the bobbin cage 2 has executed one revolution, the chain 8 has also carried out one revolution, the chain 8 extending over an elongated path of travel. Instead of a single chain 8 it would also be possible to use two independent chains (not shown), of which the outer chain is the driving chain and the inner chain the actual filament-guiding chain which is expediently constructed as a roller chain, the bores for the filaments, wires and the like to pass through being arranged in the said rollers. Within the endless roller chain a floatingly arranged guide rail (not shown) can be provided.

The other frame, which is referred to by the numeral 12, accommodates a welding device. Mounted in the frame 12 is a cylinder 13 over which is guided a meshwork unit formed by means of the filament guide device 6. Also arranged on the frame 12 are welding units 14 with electrodes by which the wires are welded to one another at the points of intersection of the meshwork unit, as will be explained in more detail hereinafter; a finished meshwork unit 15 passes over guide rollers 16 and 17 to a winding shaft 18 on which the meshwork unit 15 is wound in the form of a reel. The frame 12 can be arranged in stationary manner, or alternatively it can also be made displaceable.

The construction of the cylinder 13 in accordance with the invention will be explained with reference to FIGS. 4 to 8. The cylinder 13 consists of a material which is a good conductor of electricity, more particularly copper. It is preferably of hollow construction and can be provided with water cooling means (not shown) internally. Inserted in annular depressions 19 in the cylinder 13 are profile rings 20 which project from a peripheral surface 21 of the cylinder 13 and consists of electrically insulating material e.g. rubber, synthetic plastic material or the like. The rings 20 are provided at the outer surface thereof with channel-like recesses 22 and 23, preferably V-shaped in section. The channel-like recesses 22 and 23 extend in a diagonal direction with respect to the movement of conveyance of the meshwork unit 15 being guided over the cylinder 13 with its rings 20. The course of movement of the V-shaped recesses 22 and 23 corresponds to the pattern of the filaments or wires of the meshwork unit 15, which intersect one another diagonally to the longitudinal direction of the meshwork unit 15.

In all the spaced-apart rings 20 there are provided two V-shaped recesses 22 and 23 which are disposed diagonally to one another in the same direction as the intersecting wires of the meshwork unit 15. The correspondingly disposed filaments or wires of the meshwork unit 15, which are referred to by the numerals 24 and 25, come to lie in these V-shaped recesses, the wires 24 lying in the V-shaped recesses 22 and the wires 25 in the V-shaped recesses 23. The rings 20 are arranged at a distance from one another on the cylinder 13. They form between themselves grooves 26 and 29 which extend circumferentially about the cylinder with each groove having a base surface which is the peripheral surface 21 of the copper cylinder 13 and the grooves 26 and 29 being disposed in alternating relation.

With appropriate spacing of the rings 20 from one another, the meshwork unit 15 lies in the diagonally arranged channels 22 and 23 in such a manner that points of intersection 27 and 28 of the filaments or wires of the meshwork unit 15 are situated in the middle of the grooves 26 and 29, respectively. The points of intersection 27 and 28 of the meshwork unit 15 are offset relative to one another, the points of intersection 27 being situated in the grooves 26 and the points of intersection 28, which are offset from the points of intersection 27 being situated in the grooves 29. In this way, the meshwork unit 15 running onto the copper cylinder 13 is immovably secured during its formation by the diagonally disposed channels 22 and 23.

In order to prevent damage to the peripheral surface 21 of the copper cylinder 13, there are arranged copper strips 30 which are of substantially greater length than the periphery of the cylinder and move with the cylinder in the grooves 26 and 29. The freely suspended parts of the copper strips 30 pass about rollers 31 and lower reversal ends of the endless copper strips 30 are conveniently loaded by a cylinder 32, so that the copper strips 30 are retained tightly about the cylinder periphery in the grooves 26 and 29, and bear close against the peripheral surface 21 of the cylinder 13. The welding heat can be effectively dissipated by means of these strips 30. The strips 30 are of such a thickness that the meshwork unit wires at the points of intersection 27 and 28 bear directly on the strip surface. The diagonal pattern of the channels 23 and 22 is adapted to the actual mesh pattern of the meshwork unit 15.

In the illustrated example of embodiment, the wires of the meshwork unit 15 intersect at the right angle. If a meshwork unit is to be manufactured having wires situated at a smaller or larger angle than 90°, the cylinder 13 with the profiled rings 20 must be replaced.

Electrodes engage in the grooves 26 and 29 formed by the profiled rings 20. These electrodes, as is best shown in FIGS. 15 and 16, consist of rollers 33 each of which is constructed to have a projecting disc 34 and a hub 35. The hub 35 is provided with stepped surfaces 36 fitted with carbon rings 37 which have the task of reducing friction with respect to the mounting thereof in a manner to be hereinafter described.

Figure 9:
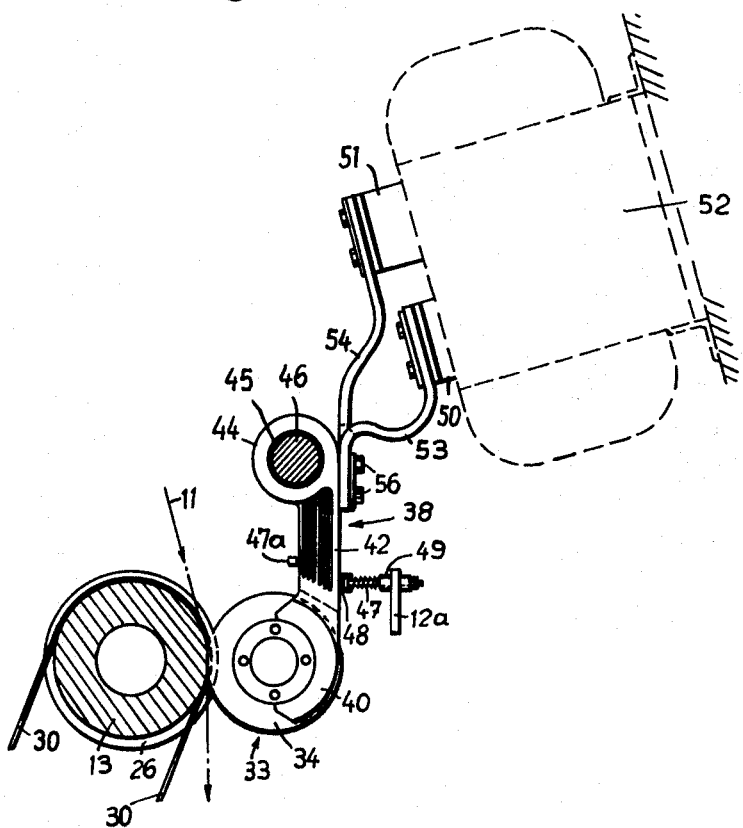
FIGS. 9 and 10 are views on a larger scale of an electrode holder with the electrode rollers and the copper cylinder and also the arrangement of the transformer, FIG. 9 being a fragmentary longitudinal sectional view, and FIG. 10 being an end view of the parts shown in FIG. 9.
Figure 10:
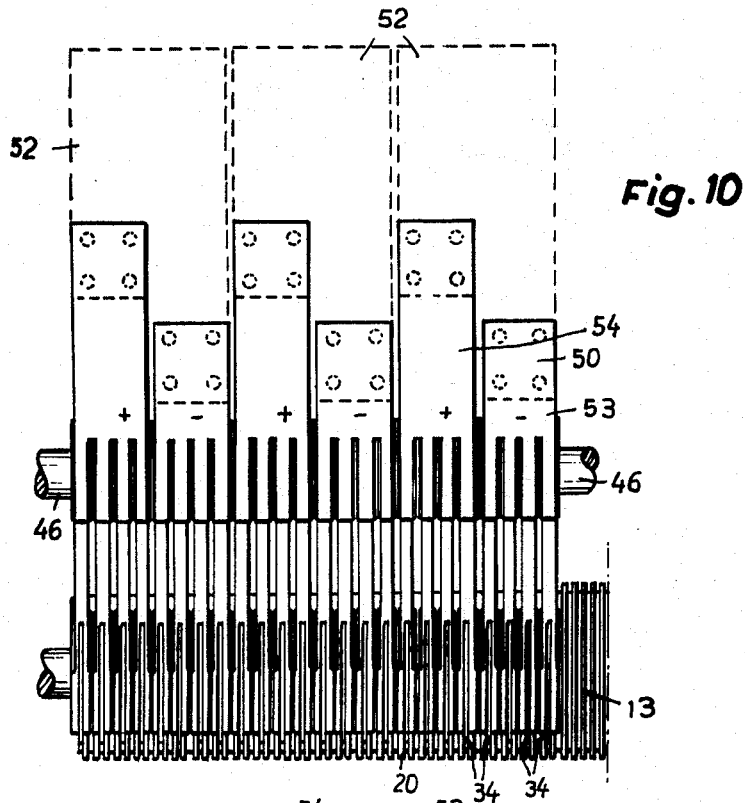

The roller electrodes 33 are supported by electrode holders 38 (FIGS. 12 and 13). Each of the holders 38 consists of electrically satisfactorily conductive material e.g. copper and has parallel arcuate supporting cheeks 39, 40 which are like forks, and with a clamping action, embrace a respective one of the roller electrode discs 34. The carbon rings 37 of the respective roller electrode 33 adjoin curved inner surfaces 41 of the cheeks 39 and 40. The cheeks 39 and 40 are carried by an arm 42 which is provided with projecting ribs 43. Situated at the other end of the holder 38 is an eye 44 which is mounted with inter-position of an insulating ring 45 on a supporting shaft 46 so that the electrode holder 38 in its entirety can swing about the shaft 46 (FIG. 9). Each holder 38 is under the action of a spring 47 disposed between an abutment 48 of which bears on the holder 42 and an abutment 49 which is adjustably arranged in a fixed frame part 12a, the part 49 being an externally threaded sleeve which is secured into the frame part 12a.

In order that each roller electrode 33 can be held at a distance from the peripheral surface of the copper cylinder 13, so that the welding current acts only at the points of intersection of the meshwork wires to be welded, the pivoting movement of each holder 38 is limited by a stop 47a (FIG. 9). However, the welding time and the welding power can also be controlled electronically, so that it is not necessary for the roller electrode to be held at a distance from the peripheral surface of the copper cylinder. Electronic control can be so carried out with the help of a selenium cell in a conventional manner that the welding current flows only for short periods when the roller electrodes are situated exactly on a point of intersection. Since the welding time amounts to only a few hundreds of a second, the welding current is already switched off when the roller electrode 33 rolls off of the wires at the point of intersection. In this case the limiting stop 47a can be dispensed with.

Figure 11:
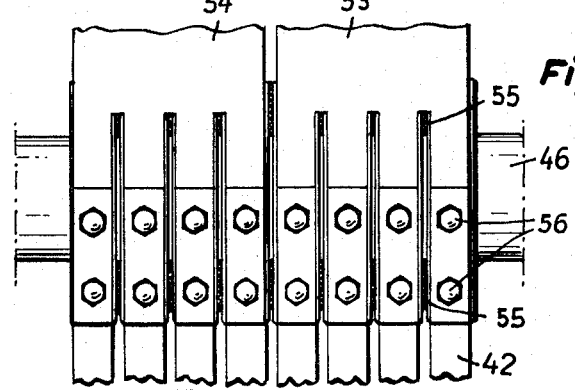
FIG. 11 is a fragmentary end view similar to FIG. 10 on a larger scale showing the connection of the secondary strips of the transformer.

Electrode holders 38 are electrically connected to poles 50 and 51 of a transformer 52 by means of strip-form supply leads 53 and 54. Advantageously, several adjacently disposed roller electrodes 33 are grouped together, for example, in set of four rollers each, as FIG. 11 shows. The first four roller electrodes 33 are electrically connected to the pole 50 which is a negative pole, while the next adjoining roller electrodes 33 are electrically connected to the pole 51 which is the positive pole of the transformer 52.

The current supply leads 53 and 54 have individual fingers and insulating discs 55 are arranged between the individual fingers of the current supply leads 53 and 54. The set of electrode holders and roller electrodes described for a transformer 52 can be repeated as often as grooves 26 and 29 at the copper cylinder 13 are to be fitted with roller electrodes 33. As soon as a roller electrode 33 runs over a point of intersection 27 or 28 of the meshwork unit, the current flows through in each case and the intersection point between the wires or the like is electrically welded at the instant at which the particular roller electrode 33 rolls over the point of intersection. The copper cylinder 13 or the copper strips 31 serve as counter-electrodes or bridge electrodes. The holders 38 are connected to the supply strips 53 and 54 by bolts 56. The transformers 52 are situated side by side and are fixed on carriers 57 and 58 which form parts of the frame 12.

The driving power for the bobbin cage 2 and the guide device chain 8 is taken from a motor 59 which drives a gearwheel 60 with interposition of a transmission which is not shown in the drawings. From this gearwheel, the line of drive goes through drive parts which include a gearwheel 61, a chain wheel 62, a chain 63, a chain wheel 64, a gearwheel 65 and a gear wheel 66 to a bobbin cage drum 67 which is rotatable about the stationary shaft 4 with interposition of needle bearings 68 or the like (FIG. 1). A further line of drive from the gearwheel 60 is through a shaft 69 and the drive parts 71 to 74 to the chain wheel 9 over which the chain 8 is entrained, so that the bobbin cage 2 and the chain 8 are in a predetermined speed relationship relative to one another.

The drive for the copper cylinder 13 is also conveniently taken from the shaft 69. This can be effected through the agency of the drive parts 75 to 80 which include gears, chain wheels and chains, so that the copper cylinder 13 is driven at a specific speed relationship with respect to the bobbin unit 2 and the guide device 8. The frame 1 is mounted for displacement by means of wheels 103 in a direction transverse of the frame 12. For this purpose, the drive parts are constructed so that they can be connected to one another and disconnected from one another at suitable points. In this way, it is easy to replace an empty bobbin cage 2 with a new full bobbin cage on another frame 1 so that the necessary stoppage time can be kept extremely short.

The general method of operation of the apparatus is that the filaments, wires and the like are drawn off the bobbins 3 arranged on the bobbin cage 2 and are taken through the guide device 8, in order to form a meshwork unit 15 having filaments intersecting diagonally to the longitudinal direction, to the copper cylinder 13 on which the meshwork unit 15 thus prepared lays in the grooves 22 and 23 which are appropriately arranged. While the meshwork unit 15 continuously travels over the rotating cylinder 13, the welding of the points of intersection of the meshwork unit is effected automatically by means of the sets of roller electrodes 33 after which the welded meshwork unit 15 continuously travels over the rotat- The roller electrodes of an upper welding device 14 weld, for example, the points of intersection 27 whereas the roller electrodes of the welding device 14 arranged further below weld the points of intersection 28, which are offset with respect to the first points of intersection.

The meshwork unit 15 produced according to the invention can be provided both at the edges thereof and over the width thereof with longitudinal wires which can be inserted during the manufacture of the meshwork unit. The longitudinal wires are introduced into the meshwork unit 15 being produced in the region of the intersecting meshwork wires. The longitudinal wires can have the mesh forming wires looped about them. At the points of intersection of the meshwork wires, the longitudinal wires are then welded to the two intersecting wires. The longitudinal wires can be selectively introduced freely at the edges or may be welded to the diagonally intersecting wires by means of an additionally arranged welding device within the machine. Providing longitudinal wires, particularly at the edges of the meshwork unit, achieves the advantage of enabling the finished meshwork unit to be suspended or tensioned at the edge wires or longitudinal wires independently of whether these are welded to the rest of the meshwork unit 15 or not.

FIGS. 17 to 20 show an embodiment of the apparatus for feeding in the edge wires or longitudinal wires. As FIG. 3 shows, a guide device 6 is situated upstream of the cylinder 13. This device consists of a chain 8 which is guided about chain wheels 9 at the ends. Two independent chains 8 and 81 are provided for the guide device 6. The chain 8, which is the driving chain, is an endless chain extending about the chain wheels 9. Situated between the parallel runs of the driving chain 8 is the actual filament guide chain 81 which can be constructed as a roller chain, the rollers 82 being provided with longitudinal bores 83 through which the filaments 11 drawn off the bobbin cage can be guided. The endless roller chain 81 circulates about a guide rail 84. This guide rail 84 is provided in a floating arrangement between the runs of the chain 8. The driving chain 8 is provided with drivers 85 which engage between the rollers 82 of the thread guide chain 8. Since the drivers 85 engage simultaneously into the upper and lower runs of the filament guide chain 81, the guide rail 84 remains in an unchanged position together with the filament guide chain 81 surrounding the said rail. The guide rail 84 can be provided at any desired points, particularly at the ends, with bores 86 through which the aforementioned edge or longitudinal wires can be passed. The driving chain 8, shortly before reaching the chain wheel 9, passes around rollers 87 whereby the driving chain 8 is held tensioned.

FIGS. 17 to 20 show the running of an edge wire 88 into the meshwork unit 15 which is being formed from the wires 24 and 25. In order that the meshwork unit 15 should be held tightly over the peripheral surface of the cylinder 13 in accordance with the recesses 22 and 23, there are provided spreader fingers 89 which draw the edge wire 88 and therefore the meshwork unit 15 which is formed towards the side. The fingers 89 are provided at the rear ends thereof with rollers 90 which are guided in an annular guide groove 91. The groove 91 has a camming portion 92 whereby the fingers 89 are displaced in the axial direction of the cylinder 13. On the return path of the groove 91 a camming portion (not shown) corresponding to the portion 92 is interposed for returning the fingers 89. The groove 91, in its annular course, is turned in a flange 93 from the inside. The flange 93 is fixed rigidly on the machine frame 12. The profiled cylinder 13 rotates with the flanges 93. At the same time, the fingers 89 are thereby moved axially to the longitudinal direction of the cylinder 13 in the groove 91. Dogs 94 mounted on the finger 89, before the point of contact between the roller electrodes 33 and the profiled cylinder 13 at a point 95, engage behind the edge wire 88 and draw the same as the rotational movement of the fingers 89 progresses, in the axial direction of the profiled cylinder 13 into their final position at the edge of the meshwork unit which has been found. The fingers 89 are mounted so as to be longitudinally displaceable on the guide ring 96, the fingers 89 being arranged in grooves 97 of the guide ring 96. The guide ring 96 is fixed on a shaft 98 which carries at the free end thereof a gearwheel 99 and at the other end a flange 100 which is insulated by insulating inserts 101 from the cylinder 13. The shaft 98 is connected by the flange 100 and bolts 102 to the profiled cylinder 13.

The meshwork unit to be produced can be made from any suitable weldable filaments or wires, e.g. iron wires. Alternatively, weldable synthetic plastic material filaments can also be connected in a suitable manner at points of intersection by means of the apparatus according to the present invention.

It is to be understood that although only a preferred embodiment of the invention has been disclosed, minor variations may be made in the apparatus in accordance with the invention, as defined by the appended claims.

What is claimed as new is:

1. An apparatus for forming meshwork units from wires and the like wherein the wires intersect diagonally, said apparatus comprising a cylinder having a plurality of rings of insulation material therearound in longitudinally spaced relation defining a plurality of spaced grooves, said rings having surface contours for having wires of the meshwork unit seated therein in fixed crossing relation with the wires intersecting in alignment with said grooves, and roller electrodes disposed in said grooves for rolling contact with the wires at the points of intersection.

2. The apparatus of claim 1 wherein said cylinder is formed of a material having good electrical conductivity.

3. The apparatus of claim 1 together with strips of conductive material passing over said cylinder within said grooves and beneath said electrodes.

4. The apparatus of claim 1 together with strips of conductive material passing over said cylinder within said grooves and beneath said electrodes, said strips being endless and of a much greater peripheral extent than said cylinder to provide for effective cooling thereof.

5. The apparatus of claim 4 wherein each roller electrode includes a projecting disc and is mounted for rotation in an electrode holder, said holder having fork-shaped jaws between which said disc closely bears in projecting relation.

6. The apparatus of claim 1 together with means for supplying current to said roller electrodes with neighboring electrodes being of different polarity and said cylinder acting as a bridge electrode to complete the circuit.

7. The apparatus of claim 1 wherein a bobbin holds the wires, said bobbin being mounted on a carrier supported by a frame movable relative to said cylinder, and there being a plurality of frames and bobbin carriers to facilitate the changing of bobbins.

8. The apparatus of claim 7 wherein each frame is provided with a drive unit and a guide device for the wires whereby each frame supports a complete unit for supplying wires of meshwork unit to said cylinder.

9. The apparatus of claim 1 together with a guide device for supplying the wires of the meshwork unit in the required order, said guide device including means for also presenting longitudinal wires.

10. The apparatus of claim 1 together with a guide device for supplying the wires of the meshwork unit in the required order, said guide device including means for also presenting longitudinal wires, said guide device including displaceable spreader fingers for guiding edge wires, said fingers being disposed at the ends of said cylinder and being displaceable longitudinally of said cylinder.

11. The apparatus of claim 10 wherein the displacement of said fingers is controlled by a fixed cam groove.

12. The apparatus of claim 1 together with a guide device for supplying the wires of the meshwork unit in the required order, said guide device including means for also presenting longitudinal wires, said guide device including an endless wire guide chain mounted for movement around a floating rail, and said rail having wire passing bores aligned with the groove of said cylinder.

13. An apparatus for forming meshwork units from wires and the like wherein the wires intersect diagonally, said apparatus comprising a member having insulating means therearound defining a plurality of longitudinally spaced grooves, said insulating means including portions defining surface contours for having wires of the meshwork unit seated therein fixed closing relation with the wires intersecting in alignment with said grooves, and electrode means disposed in said grooves for pressurized contact with the wires at the points of intersection.

14. The apparatus as claimed in claim 13 including a wire filament guide device disposed directly before said member and including portions for receiving each individual wire and directing them to said longitudinally spaced grooves defined by said insulating means.

References Cited by the Examiner

UNITED STATES PATENTS

| | | | |
|---|---|---|---|
| 966,827 | 8/1910 | Gustave | 242—158.5 |
| 1,357,434 | 11/1920 | Anderson | 242—158.5 |
| 1,377,052 | 5/1921 | Black | 242—139 |
| 1,842,120 | 1/1932 | Riley | 219—56 |
| 1,908,050 | 5/1933 | Reed | 219—56 |
| 2,243,832 | 6/1941 | Bohn | 219—83 |
| 2,833,110 | 5/1958 | Fredriksson et al. | 242—130 |

RICHARD M. WOOD, *Primary Examiner.*

B. A. STEIN, *Assistant Examiner.*